UNITED STATES PATENT OFFICE.

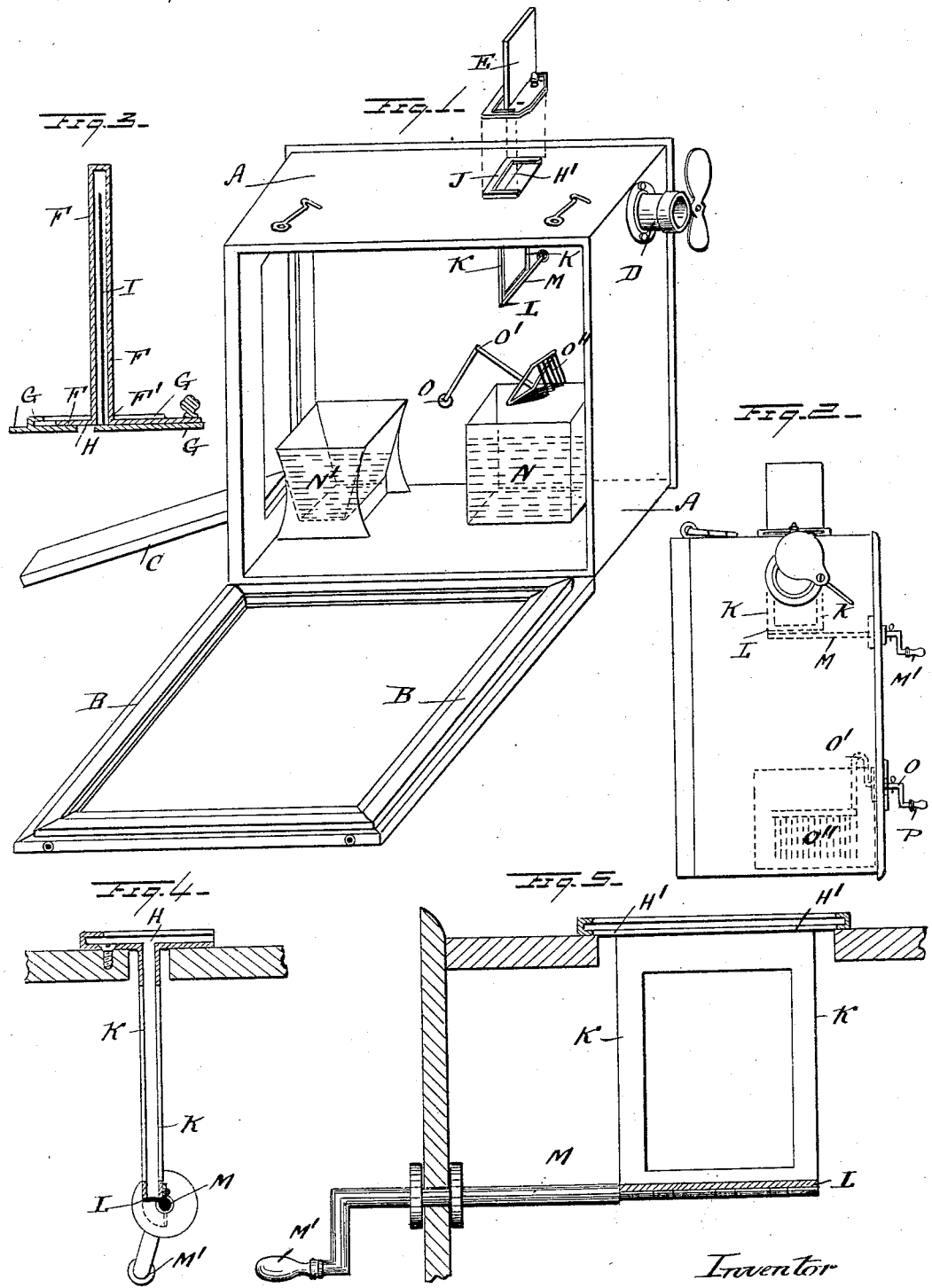

RAMON ARAMBURU, OF BARCELONA, SPAIN.

PHOTOGRAPHIC DEVELOPING-CABINET.

SPECIFICATION forming part of Letters Patent No. 557,633, dated April 7, 1896.

Application filed October 6, 1894. Serial No. 525,148. (No model.)

*To all whom it may concern:*

Be it known that I, RAMON ARAMBURU, a subject of the King of Spain, and a resident of Barcelona, in the Kingdom of Spain, have invented a certain new and useful Improved Portable Dark Room for Photographic and Similar Processes, of which the following is a specification.

The apparatus which forms the object of this invention essentially consists of a dark chamber or camera for the exposure of photographic plates for the reception of the image thrown thereon, and at the same time containing the necessary apparatus for effecting the developing and fixing of such pictures, all which operations are directed from outside by simple means. Consequently this apparatus can be used for producing upon ferrotype or similar plates photographs of exterior objects and for delivering the finished photograph after a very short delay.

The apparatus forming the object of this invention is shown in the annexed drawings, in which—

Figure 1 is a perspective view of the camera opened to show interior parts. Fig. 2 is an end view thereof. Fig. 3 illustrates the means for inserting the sensitive plate. Fig. 4 is a cross-section, and Fig. 5 an elevation, of the frame in which the sensitive plate is held during exposure.

It consists of a box A, provided with two doors, the one, B, arranged laterally and the other, C, at the back. At one end the box A is provided with an orifice, over which the lens D is fixed, which is provided with a covering plate or shutter of any convenient form.

The plate-carrier E is an auxiliary part of the box, and is represented in section in Fig. 3. This plate-carrier consists of a receiver F, of rectangular cross-section, mounted so as to slide on a small platform G, provided with a slit H. By a sliding motion imparted to the receiver F the space within the plate-carrier can be made to exactly coincide with the orifice or slit H. When the groove H and the orifice F' of the receiver F are not in register the latter will be entirely closed, and, on the contrary, when coincident or in register the receiver will be open, in order that the plate I may be placed in the receiver F or may be allowed to fall out of the same, respectively.

The plate-carrier, consisting of parts F and G, is fixed so as to slide on or in the guides J, placed on the upper part of the box A. In this box is also arranged a slit H', which exactly coincides with H when the plate-carrier is mounted on the box A. Below the slit H' is the frame K, Figs. 1 and 2, which is represented in section in Fig. 4 and in front view in Fig. 5. This frame is placed at the focus of the lens D, so as to expose the plate at the moment when it is to receive the luminous image. The lower part of this frame K is open, being provided with a hinged floor-plate L, which can be actuated from outside by means of the shaft M in connection with the crank M'. The plate is allowed to fall into the frame K, duly closed by the floor L, and remain therein until the floor is opened from the outside, when the plate will fall out of the frame by its own weight.

Inside the box A two troughs or baths N N' are arranged, one of which contains the developing-bath and the other the fixing-bath. O is a suitably-fixed rotary axle provided with an angular arm O O', the extremity of which carries a metallic basket O'' of iron wire. From outside a rotary movement can be imparted to shaft O by means of the crank P, Fig. 2.

To commence the operation, the basket O'' is raised out of the trough N, so that when the plate falls from the framing K K, the floor L being opened, said plate falls in the interior of the basket O''. In this way the plate is subjected in the trough N to the action of the developing-bath, and when the time elapsed is considered sufficient the outside crank P is turned, so that at the same time the plate-holding basket O'' is turned, and as soon as this basket arrives to a certain position—that is, at a certain angle of inclination—the plate will drop out of the basket by its own weight and fall into the fixing-bath in the trough N'. The prescribed time being elapsed, the operator opens the door C and takes out the plate with the duly-fixed picture on it. After it is washed the photograph is finished.

The door B, which closes light-tight, is arranged for regulating and preparing the apparatus in the interior.

To obtain a photograph after the doors of of the apparatus are shut and the baths prepared, a plate-carrier (of which several may be kept in readiness) is taken containing a sensitive plate. The latter is then placed on the guide J by sliding along the receiver F, the plate falling into the framing K, thus taking its place opposite the lens. Exposure of the plate is then effected by opening the shutter, and after having closed the latter again the crank M' is actuated and the impressed plate falls into the basket O'', which latter rests in the trough N. Having laid therein a sufficient time, the crank P is actuated, and thus by the medium of the movement of the basket O'' the plate is transported from the trough N to the trough N', and from this latter it is extracted, after a sufficient time has elapsed, on opening the door C.

I claim as my invention—

1. A photographic apparatus having a chamber A, a lens D adapted to project an image into said chamber, a frame K adapted to hold a sensitive plate to receive said image, the chamber-wall having an orifice H' in register with said frame, a movable bottom L to said frame, means for moving the bottom L from outside the chamber, a crank-shaft O with arm O', a basket O'' carried by said arm and reservoirs for baths into one N of which said basket may be immersed, the whole in combination substantially as set forth.

2. The combination with a closed photographic chamber A containing means for exposure and development of sensitive photographic plates and having an orifice H' for separate insertion of said plates, of a plate-holder F having an orifice F' at one end, a plate G adapted to slide across said orifice and having a passage H' and a guide J for receiving said plate G substantially as and for the purpose set forth.

In witness whereof I have signed this specification in presence of two witnesses.

RAMON ARAMBURU.

Witnesses:
HUBERT W. BOWEN,
JUAN GAVARRO.